(12) United States Patent
Jiang

(10) Patent No.: US 11,956,873 B2
(45) Date of Patent: Apr. 9, 2024

(54) AUTOMATIC CONTROL SYSTEM AND CONTROL METHOD FOR FOLLOW SPOT LIGHT

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd. (CN)

(\*) Notice: Subject to any disclaimer, the term of this patent is extended or adjusted under 35 U.S.C. 154(b) by 278 days.

(21) Appl. No.: 17/407,304

(22) Filed: Aug. 20, 2021

(65) Prior Publication Data

US 2021/0385928 A1 Dec. 9, 2021

Related U.S. Application Data

(63) Continuation of application No. PCT/CN2021/074038, filed on Jan. 28, 2021.

(30) Foreign Application Priority Data

Jun. 3, 2020 (CN) .......................... 202010494442.1

(51) Int. Cl.
*H05B 47/115* (2020.01)
*G05B 11/01* (2006.01)

(52) U.S. Cl.
CPC ............ *H05B 47/115* (2020.01); *G05B 11/01* (2013.01)

(58) Field of Classification Search
CPC .... H05B 47/115; H05B 47/165; G05B 11/00; G05D 3/12
See application file for complete search history.

(56) References Cited

U.S. PATENT DOCUMENTS

| 7,432,803 B2 * | 10/2008 | Fails | H04J 13/00 340/539.11 |
| 2019/0141800 A1 * | 5/2019 | Rhodes | H05B 47/19 |

FOREIGN PATENT DOCUMENTS

| CN | 201689343 U | | 12/2010 |
| CN | 107135587 A | * | 9/2017 |
| CN | 107135587 A | | 9/2017 |
| CN | 206559705 U | | 10/2017 |
| CN | 206790751 U | | 12/2017 |
| CN | 107708273 A | | 2/2018 |

(Continued)

OTHER PUBLICATIONS

Machine translation of CN107135587A. (Year: 2017).*

(Continued)

*Primary Examiner* — Alexander H Taningco
*Assistant Examiner* — Pedro C Fernandez
(74) *Attorney, Agent, or Firm* — Lerner David LLP

(57) ABSTRACT

An automatic control system includes a tag, a base station, a main controller, and an auxiliary controller. The tag is bound to a target and transmits a target position signal. The base station is in communication connection with the tag and receives the target position signal. The main controller includes an angle conversion module, a protocol conversion module, and a data filtering module, in which the angle conversion module is in communication connection with the base station to convert the target position signal into a first light angle control signal. The auxiliary controller includes an effect control module that transmits the light effect control signal and a second light angle control signal.

10 Claims, 1 Drawing Sheet

(56) References Cited

FOREIGN PATENT DOCUMENTS

| | | |
|---|---|---|
| CN | 109089211 A | 12/2018 |
| CN | 208186024 U | 12/2018 |
| CN | 109117809 A | 1/2019 |
| CN | 209540750 U | 10/2019 |
| CN | 110427055 A | 11/2019 |
| EP | 3361833 A2 | 8/2018 |

OTHER PUBLICATIONS

Martin, Martin M2GO M2PC Safety and Installation Guide. (Year: 2012).*

International Search Report for PCT/CN2021/074038 dated Apr. 19, 2021; 10 pages.

* cited by examiner

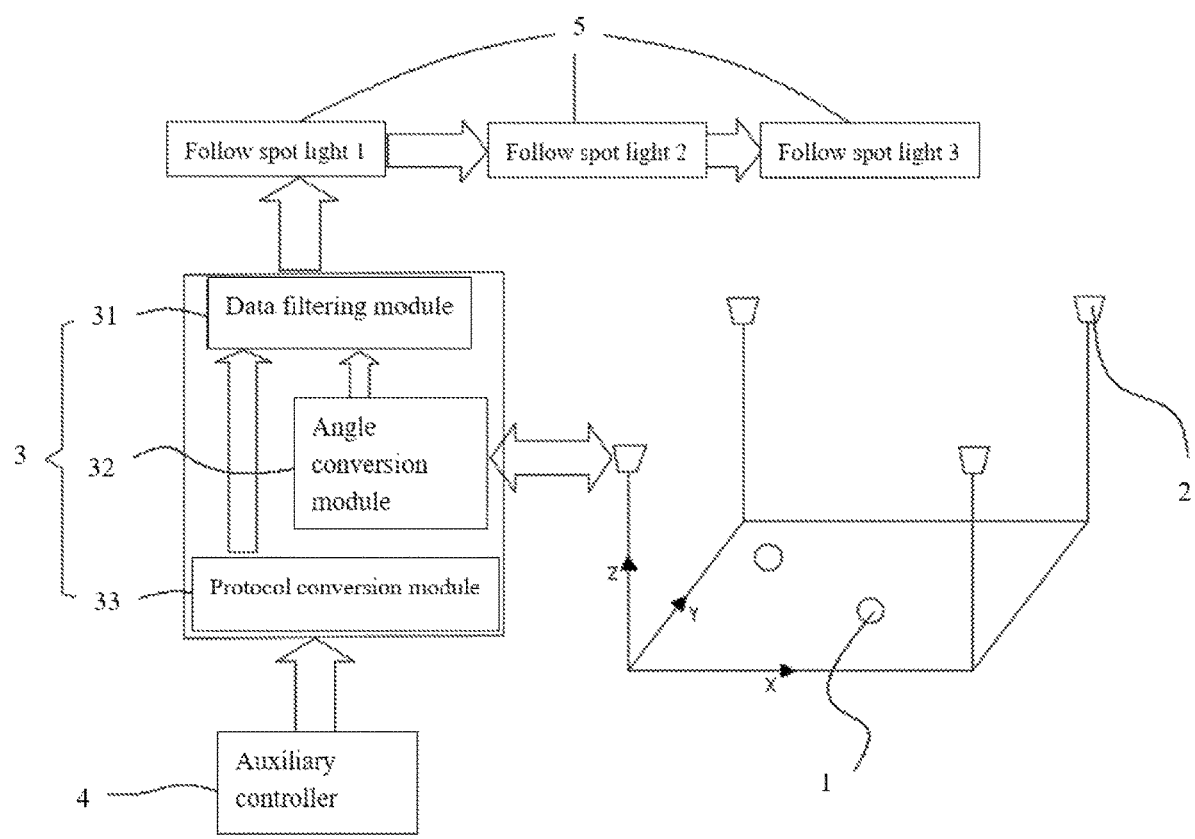

AUTOMATIC CONTROL SYSTEM AND CONTROL METHOD FOR FOLLOW SPOT LIGHT

CROSS REFERENCE TO RELATED APPLICATIONS

The present application is a continuation of International Application No. PCT/CN2021/074038, filed on Jan. 28, 2021, which claims priorities from Chinese Patent Application No. 202010494442.1 filed on Jun. 3, 2020, all of which are hereby incorporated herein by reference.

TECHNICAL FIELD

The present invention relates to the technical field of follow spot light control, and more specifically to an automatic control system and an automatic control method for a follow spot light suitable for use on stage.

BACKGROUND

A "follow spot light" is an important lighting fixture essential to present stage arts. A primary function of a conventional "follow spot light" is to produce a bright, "round light spot with clear boundary" on the stage, which is controlled by an operator under the command of a director and is moved with the movement of a performer on the stage. The use of the follow spot light can exhibit a variety of stage arts and experiences as required by a program, thereby achieving purposes of highlighting a stage focus and heightening ambient atmosphere and the like.

Most of the follow spot lights on the market have to be used for light following by professionals according to performance requirements. Meanwhile, a follow spot light is a high-power projector light, a heat dissipation system of which may involve safety concerns for the operator. Thus, to operate a follow spot light is a professional work with certain risks.

At present, there are some control systems and tracking systems for a follow spot light on the market as an attempt to solve the risk problem thereof, which are mainly divided into the following categories.

A stage lighting automatic tracking system having a plurality of pressure sensors for detecting a target position. Such type of systems mainly detect the target position by providing a plurality of detection devices (pressure sensors) on the stage, and ultimately controls a illumination direction of light, thereby achieving purposes of automatically following the target to move by stage lighting and automatic unmanned operation. For example, CN 201689343U (Automatic stage lighting tracking system) can implement an automatic target tracking function. Deficiencies of such systems include a need to provide an array of pressure sensors on the stage and an inability to track when feet of a tracked performer leave the stage, as well as interferences from other objects with weights on the stage.

A method of detecting a target with a camera, analyzing the target position by an image processing technique, and controlling the light to automatically track the target position. A difficulty of such systems is to determine the target. In addition, cameras have limited ranges, and thus a plurality of cameras are needed to stitch captured images, the system is bulky, and a computer server is needed to be connected to process multi-channel video data. Sometimes a tracked object carries an infrared transmitter as a signal marker, but there is a problem that markers produced by the tracked object itself or other objects are sometimes invisible, so that a plurality of markers (infrared light transmitters) must be attached to the tracked object to prevent this problem. In addition, when a usage environment has infrared light from a non-infrared light transmitter, such as a surveillance camera with a night vision function, a failure to track the tracked object occurs.

An existing stage lighting position tracking system includes a projector light and a projector light circuit control system for controlling the projector light, in which the projector light is capable of performing an automatic tracking function according to stage objects. However, the stage light can only control light angles and fails to achieve lighting effect control at the same time, and thus the applicability is insufficient.

SUMMARY

The present invention aims thus provides an automatic control system and control method for a follow spot light, which does not need for host computer software for positioning control and inability to simultaneously control lighting effects. The automatic control system utilizes an ultra-wideband (UWB) ranging positioning technique to convert positioning coordinate data of a target to an illumination angle of a stage light, then controls an output light effect in conjunction with an auxiliary controller, connects one or more follow spot lights using signal lines, and achieves an automatic target tracking function by the lighting.

According to the present invention, the follow spot light automatic control system, including a tag, a base station, a main controller, and an auxiliary controller. The tag is bound to a target and transmits a target position signal. The base station is in communication connection with the tag and receives the target position signal. The main controller includes an angle conversion module, a protocol conversion module, and a data filtering module, in which the angle conversion module is in communication connection with the base station to convert the target position signal into a first light angle control signal. The auxiliary controller includes an effect control module that transmits a light effect control signal and a second light angle control signal. The effect control module is in control connection with the follow spot light through the protocol conversion module and the data filtering module in sequence. The protocol conversion module is used to analyze and transmit the light effect control signal and the second light angle control signal to the data filtering module. The angle conversion module is in control connection with the follow spot light through the data filtering module. The data filtering module is used to filter the second light angle control signal and transmit the first light angle control signal and the light effect control signal to the follow spot light.

In the present invention, the main controller uses an i.MX RT 1052 microprocessor as a main control chip, integrates a Cortex-M7 core, has the highest dominant frequency of up to 600 MHz, has an extended 32M SDRAM memory, an 8M QSPI FLASH code memory, a 32M SPI FALSH data memory, an external 7 inch RGB touch screen, and supports an Ethernet interface, a DMX I/O interface, a TFT card interface, and a USB interface.

The protocol conversion module transmits a DMX signal of the auxiliary controller to the main control chip through an ISO3088 chip or the like, and the main control chip analyzes a DMX protocol and converts the DMX signal to channel data for light control, i.e., the light effect control signal and the second light angle control signal.

The angle conversion module forms an Ethernet interface through a device such as a DP83848 chip, receives ranging data from the base station, i.e., the target position signal, determines a coordinate position of the tag by calculation, and then converts the coordinate position into a projection angle of the follow spot light, i.e., the first light angle control signal.

The data filtering module filters horizontal relative angle control data and vertical relative angle control data for controlling the follow spot light through the main controller, i.e., filters the second light angle control signal that is then replaced with projection angle data calculated by the angle conversion module, i.e., replaced with the first light angle control signal and the light effect control signal, and outputs the DMX signal through a device such as a MAX14783 chip.

By setting the main controller and a collection of the angle conversion module, the protocol conversion module, and the data filtering module on the main controller according to the present invention, host computer software is not needed for positioning control and positioning transmission. Further, the setting of the auxiliary controller enables the follow spot light automatic control system not only to control rotation angles of the follow spot light, but also to control illumination effects of the follow spot light according to actual needs, and thus the applicability is greatly improved.

The protocol conversion module can support at least one of a DMX512 protocol, a DMX512A protocol, a RDM protocol, an ACN protocol, an ArtNet protocol, an sACN protocol, a KNX protocol, a DALI protocol, and/or a DSI protocol.

The angle conversion module is in communication connection with the base station using UDP.

The auxiliary controller is connected to the main controller, and an output light effect of the follow spot light can be flexibly controlled by the auxiliary controller, which is an MA or Martin console.

The base station is in communication connection with the tag through time division multiple access.

The follow spot light is a directional illumination device, which may be any kind of a computer moving head light.

The base station is used for ranging positioning, the number of base stations is at least four, all of which are provided around a site to be followed, and positioning accuracy can be improved by increasing the number of base stations.

The number of tags is 1 to 4. The tag can be freely moved, communicates with different base stations separately, determines a distance between the tag and a base station by calculating a time of flight of an electromagnetic wave in the air, and then uploads ranging data to the above main controller through the base station in real time.

Several follow spot lights are provided, the number of follow spot lights is no less than the number of tags, and each follow spot light corresponds to at least one tag. Each tag corresponds to a follow spot light, which enables simultaneous tracking and illumination of a plurality of targets on the stage; when a certain target on the stage needs to be highlighted, a plurality of follow spot lights are needed to be controlled to illuminate the target at the same time.

The present invention also provides a follow spot light automatic control method implemented by the automatic control system mentioned above, the method includes the following steps:

S1, the tag transmitting the target position signal;

S2, the angle conversion module receiving the target position signal and converting the target position signal into a first light angle control signal; the effect control module transmitting a light effect control signal and a second light angle control signal; and S3, the data filtering module filtering the second light angle control signal and then transmitting the light effect control signal and the first light angle control signal to the follow spot light.

The UWB positioning technique is a carrier-free wireless positioning technique based on ultra-narrow pulse, which is high in transmission rate (up to 1000 Mbps or more), low in transmission power, and strong in penetration power. This positioning technique has centimeter-level positioning accuracy and a strong anti-interference capacity.

A plurality of tracking and positioning techniques mentioned in the background have respective features. However, when these techniques are utilized in situations of instability, complexity, and many interference factors, the present invention is significantly more advantageous, and can implement precise positioning of the target and has a strong anti-interference capacity.

Some beneficial effects of the present invention can be obtained as follows.

1. The automatic control system for a follow spot light in the present invention can automatically project light onto a target according to a position where the target is located without human intervention, and can adjust lighting effects as needed and achieve automatic control of lighting, and thus the applicability is sufficient.
2. The present invention does not need host computer software for positioning control.
3. The present invention enables precise positioning of the target, and has a strong anti-interference capacity.

BRIEF DESCRIPTION OF THE DRAWINGS

FIG. 1 is a schematic structural view of an embodiment according to the present invention.

Reference numerals: 1, tag; 2, base station; 3, main controller; 4, auxiliary controller; 5, follow spot light; 31, angle conversion module; 32, protocol conversion module; 33, data filtering module.

DETAILED DESCRIPTION

Drawings of the present invention are for illustrative purpose only and are not to be construed as limiting the invention. Some components in the drawings may be omitted, enlarged, or reduced for better illustrating the following embodiments, and sizes of these components do not represent sizes of actual products. For those skilled in the art, it will be understood that some known structures and descriptions thereof in the drawings may be omitted.

Referring to FIG. 1, an automatic control system of a follow spot light is provided according to the present embodiment includes a tag 1, a base station 2, a main controller 3, and an auxiliary controller 4. The tag 1 is bound to a target and transmits a target position signal. The base station 2 is in communication connection with the tag 1 and receives the target position signal. The main controller 3 includes an angle conversion module 31, a protocol conversion module 32, and a data filtering module 33, in which the angle conversion module 31 is in communication connection with the base station 2 to convert the target position signal into a first light angle control signal. The auxiliary controller 4 includes an effect control module that transmits a light effect control signal and a second light angle control signal. The effect control module is in control connection with the follow spot light 5 through the protocol conversion module 32 and the data filtering module 33 in sequence; the protocol conversion module 32 is used to analyze and transmit the light effect control signal and the second light angle control signal to the data filtering module 33; the angle conversion module 31 is in control connection with the follow spot light 5 through the data filtering module 33; and the data filtering module 33 is used to filter the second light angle control signal and transmit the first light angle control signal and the light effect control signal to the follow spot light 5.

By setting the main controller 3 and a collection of the angle conversion module 31, the protocol conversion module 32, and the data filtering module 33 on the main controller 3 according to the present invention, host computer software is not needed for positioning control and positioning transmission. Further, the setting of the auxiliary controller 4 enables the automatic control system of the follow spot light 5 not only to control rotation angles of the follow spot light 5, but also to control illumination effects of the follow spot light 5 according to actual needs, and thus the applicability is greatly improved.

The present invention uses a computer moving head light as a follow spot light, the computer moving head light communicates with a console through a DMX signal line or a network cable, and the console automatically assigns an address to each light; an address of a target light is firstly entered on the auxiliary controller, and then keys of various light effect control signals on the auxiliary controller are used to control the light to output light effects of light spots having different sizes, brightness, colors or the like.

The stage light in the present invention can produce a variety of effects, such as colors, shapes, atomization degree, or flickers, dynamic patterns, rotation patterns of light spots, completely replaces conventional follow spot lights, and can produce rich light effects while following light relative to the prior art. Further, lighting effects and angle control are completely independent, and effects are controlled as needed in real time using the auxiliary controller in an angle change process of the stage light.

In the present embodiment, to achieve a preset effect, a segment of light effect instruction program can be prestored in the stage light or the auxiliary controller in advance, and a corresponding light effect instruction program can be directly invoked as needed. The light effect instruction program can be at least one or more interactions of colors, shapes, atomization degree, or flickers, dynamic patterns, rotation patterns of light spots, thereby achieving different lighting effects when stage objects are in different scenes or at different positions, i.e., the follow spot light has different rotation angles, achieving preset stage effects, and great enriching the stage effects while realizing fully automatic intelligent control.

The follow spot light automatic control system in the present embodiment uses modules to collect and transmit data in the base station 2 and the tag 1. Each base station 2 needs to be calibrated using the present invention for different stages; the position of the base station 2 will not be changed after calibration is completed, otherwise the base station 2 needs to be recalibrated. The tag 1 is placed together with the target so that a position parameter of the target can be indirectly obtained by collecting a position parameter of the tag 1; the tag 1 as a beacon mainly transmits the position parameter, and the base station 2 is used to receive the position parameter.

In the present embodiment, the protocol conversion module 32 supports at least one of a DMX512 protocol, a DMX512A protocol, a RDM protocol, an ACN protocol, an ArtNet protocol, an sACN protocol, a KNX protocol, a DALI protocol, and/or a DSI protocol.

In the present embodiment, the angle conversion module 31 is in communication connection with the base station 2 using UDP.

In the present embodiment, the auxiliary controller 4 is an MA or Martin console. The MA console in the present embodiment can be obtained by purchasing MA series of light consoles manufactured by MA Lighting company, Germany. The Martin console is manufactured by Martin Lighting company.

Referring to FIG. 1, the number of base stations 2 in the present embodiment is four, all of which are provided around a site to be followed (which may be a stage or other performance sites, etc., and detailed description is omitted herein). However, the number of base stations 2 is not limited thereto. In other embodiments, the number of base stations 2 may also be 5, 6, or 7, etc., and detailed description is omitted herein, all of which are preferably provided around the stage.

In the present embodiment, the number of the tag 1 is 1 to 4. Preferably, several follow spot lights 5 are provided, the number of follow spot lights 5≥the number of tags 1, and each follow spot light 5 corresponds to at least one tag 1. Each tag 1 corresponds to a follow spot light 5, which enables simultaneous illumination of a plurality of targets on the stage. When a certain target on the stage needs to be highlighted, a plurality of follow spot lights 5 are needed to be controlled to illuminate the target at the same time.

The main controller 3 in the present embodiment includes the angle conversion module 31, the protocol conversion module 32 and the data filtering module 33, in which the angle conversion module 31 is used to receive ranging data and perform calculation, establish a space coordinates system combining an installation position of the base station 2, and calculates a spatial position at which the label 1 is located. According to the position at which the follow spot light 5 is installed on the stage, a projection angle of the follow spot light 5 is calculated; the protocol conversion module 32 is used to receive the light effect control signal transmitted from an analysis auxiliary console; the data filtering module 33 is used to filter the information output by a protocol converter, filter horizontal relative angle control data and vertical relative angle control data of the follow spot light 5 to be controlled, which are then replaced with horizontal relative angle control data and vertical relative angle control data converted by projection angle data calculated by the angle conversion module 31, such that a light projection direction of the follow spot light 5 is controlled only by the main controller 3 to automatically follow light.

The working principle of the present embodiment is that the entire system uses a main controller 3 in cooperation with an existing auxiliary controller 4 to follow the light spots. In addition, the main controller 3 has a filtering function. After the signal of the auxiliary controller 4 passes through the main controller 3, rotation signals on an X-axis and a Y-axis thereof are replaced, but the effect signals of the light are not changed.

The automatic control method implemented by the automatic control system is further provided the method includes the following steps:

S1, the tag 1 transmitting a target position signal;

S2, the angle conversion module 31 receiving the target position signal and converting the target position signal into a first light angle control signal; the effect control module transmitting a light effect control signal and a second light angle control signal; and S3, the data filtering module 33 filtering the second light angle control signal and then transmitting the light effect control signal and the first light angle control signal to the follow spot light 5.

The follow spot light automatic control method can automatically project light onto a target according to a position where the target is located without human intervention, and can adjust lighting effects as needed and achieve automatic control of the lighting, and thus the applicability is sufficient.

Obviously, the above embodiments of the present invention are merely examples for clear illustration of the technical solutions of the present invention, and are not intended to limit the implementation of the present invention. Any modification, equivalent substitution, improvement or the like within the spirit and principle of claims of the present invention should be included in the scope of the claims of the present invention.

The invention claimed is:

1. An automatic control system for a follow spot light, comprising:
    a tag that is bound together with a target and transmits a target position signal;
    a base station that is in communication connection with the tag and receives the target position signal;
    a main controller including an angle conversion module, a protocol conversion module, and a data filtering module, the angle conversion module being in communication connection with the base station to convert the target position signal into a first light angle control signal, the first light angle control signal including a projection angle data of the follow spot light; and
    an auxiliary controller including an effect control module configured to transmit a light effect control signal and a second light angle control signal, the second light angle control signal including a horizontal relative angle control data and a vertical relative angle control data of the follow spot light,
    wherein the effect control module is in control connection with the follow spot light through the protocol conversion module and the data filtering module in sequence, the protocol conversion module is configured to analyze and transmit the light effect control signal and the second light angle control signal to the data filtering module, and
the angle conversion module is in control connection with the follow spot light through the data filtering module, the data filtering module is used to filter out the second light angle control signal and transmit the first light angle control signal and the light effect control signal to the follow spot light.

2. The automatic control system for the follow spot light according to claim 1, wherein the protocol conversion module is configured to support at least one of a DMX512 protocol, a DMX512A protocol, a RDM protocol, an ACN protocol, an ArtNet protocol, an sACN protocol, a KNX protocol, a DALI protocol, and/or a DSI protocol.

3. The automatic control system for the follow spot light according to claim 1, wherein the angle conversion module is in communication connection with the base station using UDP.

4. The automatic control system for the follow spot light according to claim 1, wherein the auxiliary controller is a lighting show console.

5. The automatic control system for the follow spot light according to claim 1, wherein the base station is in communication connection with the tag through time division multiple access.

6. The automatic control system for the follow spot light according to claim 1, wherein the follow spot light is a computer moving head light.

7. The automatic control system for the follow spot light according to claim 1, wherein the number of the base station is at least four, all of which are provided around a site to be followed.

8. The automatic control system for the follow spot light according to claim 7, wherein the number of the tag is ranged from 1 to 4.

9. The automatic control system for the follow spot light according to claim 8, wherein at least one follow spot light is provided, the number of the follow spot light is no less than the number of the tag, and each follow spot light corresponds to at least one tag.

10. An automatic control method for a follow spot light, which is implemented by the automatic control system according to claim 1, the method comprising:
    S1) the tag transmitting the target position signal;
    S2) the angle conversion module receiving the target position signal and converting the target position signal into the first light angle control signal; the effect control module transmitting the light effect control signal and the second light angle control signal; and
    S3) the data filtering module filtering out the second light angle control signal and then transmitting the light effect control signal and the first light angle control signal to the follow spot light.

* * * * *